US007350199B2

(12) United States Patent
Ito et al.

(10) Patent No.: US 7,350,199 B2
(45) Date of Patent: Mar. 25, 2008

(54) CONVERTING XML CODE TO BINARY FORMAT

(75) Inventors: Yuichi Ito, Austin, TX (US); Paul L. Bleisch, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 709 days.

(21) Appl. No.: 10/346,533

(22) Filed: Jan. 17, 2003

(65) Prior Publication Data

US 2004/0143791 A1   Jul. 22, 2004

(51) Int. Cl.
G06F 9/45 (2006.01)
G06F 9/44 (2006.01)

(52) U.S. Cl. ............... 717/141; 717/137; 717/152; 717/153

(58) Field of Classification Search ........ 717/136–161; 707/513; 715/513
See application file for complete search history.

(56) References Cited

U.S. PATENT DOCUMENTS

| 6,209,124 | B1* | 3/2001 | Vermeire et al. ........... 717/114 |
| 6,397,191 | B1* | 5/2002 | Notani et al. .................. 705/9 |
| 6,468,160 | B2 | 10/2002 | Eliott |
| 6,712,704 | B2 | 3/2004 | Eliott |
| 6,769,989 | B2 | 8/2004 | Smith et al. |
| 6,804,677 | B2* | 10/2004 | Shadmon et al. ........... 707/101 |
| 6,886,046 | B2* | 4/2005 | Stutz et al. .................. 709/246 |
| 6,996,781 | B1* | 2/2006 | Myers et al. ............... 715/763 |
| 7,065,742 | B1* | 6/2006 | Bogdan ....................... 717/106 |
| 7,158,990 | B1* | 1/2007 | Guo et al. .................. 707/102 |
| 2002/0004804 | A1* | 1/2002 | Muenzel ..................... 707/513 |
| 2002/0112058 | A1* | 8/2002 | Weisman et al. ........... 709/227 |
| 2003/0023628 | A1* | 1/2003 | Girardot et al. ............ 707/513 |
| 2003/0046317 | A1* | 3/2003 | Cseri et al. ................. 707/513 |
| 2004/0162137 | A1 | 8/2004 | Eliott |
| 2004/0210878 | A1* | 10/2004 | Pagnano ..................... 717/136 |
| 2005/0131930 | A1* | 6/2005 | Jang et al. .................. 707/101 |
| 2005/0193331 | A1* | 9/2005 | Grambihler et al. ........ 715/513 |
| 2005/0273772 | A1* | 12/2005 | Matsakis et al. ........... 717/136 |
| 2006/0129689 | A1* | 6/2006 | Ho et al. .................... 709/230 |
| 2006/0130026 | A1* | 6/2006 | McHugh et al. ............ 717/141 |

(Continued)

OTHER PUBLICATIONS

Widener et al., Open metadata formats: efficient XML-based communication for heterogeneous distributed systems, IEEE, Apr. 16-19, 2001 pp. 739-742.*

(Continued)

Primary Examiner—Wei Zhen
Assistant Examiner—Satish S Rampuria
(74) Attorney, Agent, or Firm—Lee & Hayes, PLLC

(57) ABSTRACT

A technique for converting XML code to a binary format involves identifying code elements that appear in the XML code and storing them in an element palette. The XML code is then encoded by selecting predefined commands that represent the XML text-based instructions and associating the predefined commands with references to corresponding code elements in the element palette. The commands and associated references form fixed-length tokens that can be further compressed. During conversion, data is extracted and stored in an uncompressed format. The conversion produces a binary output that contains the element palette, the data, and the tokens (compressed or uncompressed). When the binary form of the XML code is loaded for execution, the tokens are decoded into instructions that operate on the elements referenced in the element palette.

44 Claims, 5 Drawing Sheets

U.S. PATENT DOCUMENTS

2006/0168513 A1* 7/2006 Coulson et al. ............. 715/513

OTHER PUBLICATIONS

Widener et al., Open metadata formats: efficient XML-based communication for high performance computing, IEEE, Aug. 7-9, 2001 pp. 371-380.*

Joung et al., XMT tools for interactive broadcasting contents description, IEEE, Nov. 14-15, 2002 pp. 184-191.*

Martin et al., WAP Binary XML Content Format, http://www.w3.org/TR/wbxml/, W3C NOTE Jun. 24, 1999, pp. 1-19.*

Girardot et al., Millau: an encoding format for efficient representation and exchange of XMLover the Web, http://www9.org/w9cdrom/154/154.html, pp. 1-22.*

Sundaresan et al., Algorithms and programming models for efficient representation of XML for Internet applications, ACM, 2001, pp. 366-375.*

Open metadata formats: efficient XML-based communication for high performance computing, Widener, P.; Eisenhauer, G.; Schwan, K., High Performance Distributed Computing, 2001. Proceedings. 10th IEEE International Symposium on 2001, IEEE, pp. 371-380.*

XML structures for relational data, Wenyue Du; Mong Li Lee; Tok Wang Ling; vol. 1, Dec. 3-6, 2001, IEEE, pp. 151-160 vol. 1.*

Scherer, Binary XML, Internet, Dec. 8, 2002, pp. 1-4.

Tolani, et. al., XGRIND: A Query-friendly XML Compressor, Dept. of Computer Science & Automation, Proceeding 18th. International conference on Data Engineering, Feb. 2002, Conf 18, pp. 225-234.

Yun Lee, et al., Data Synchronization Protocol in Mobile computing Environment Using SyncML, High Speed Networks and Multimedia Communications 5th IEEE International Conference, Jul. 3, 2002, pp. 133-137.

* cited by examiner

CONVERTING XML CODE TO BINARY FORMAT

TECHNICAL FIELD

This invention relates to systems and methods for converting XML code to a binary format that can be efficiently loaded and executed at runtime.

BACKGROUND

XML (eXtensible Markup Language) is a text-based language that is commonly used for defining data elements in Web or e-commerce documents. XML is an open standard promulgated by the World Wide Web consortium, or "W3C", which is an international industry consortium that develops common standards for the World Wide Web. XML uses a similar tag structure as HTML (HyperText Markup Language); however, whereas HTML defines how elements are displayed, XML defines what those elements contain. HTML uses predefined tags, but XML allows tags to be defined by the developer of the page. Thus, virtually any data items can be identified through XML.

As a text-based language, XML code is passed through a parser during execution. The parsing process takes time. Unfortunately, in certain situations, the delay caused by parsing the XML code may not be acceptable. One such situation is found in the video game context. Today, sophisticated video games are written in C/C++ and utilize XML for the data storage format to facilitate efficient design and debugging across a large group of developers. However, loading an XML-based video game during runtime may result in a noticeable or longer-than-desired delay from the game player's perspective. It would be desirable to shorten the load time for video games written in XML.

SUMMARY

The disclosed subject matter provides for conversion of XML code to a binary format that can be efficiently loaded and executed during runtime.

In the described implementation, the XML-to-binary conversion involves two passes through the XML code. During a first pass, code elements that appear in the XML code are identified and stored in an element palette. A single entry is made for each unique code element. Code elements that appear multiple times are listed once in the element palette.

During a second pass, the element palette is used to encode the XML code. Each line (or other logical portion) of XML code is converted to a fixed-length token having a command representative of the line of XML code and an associated reference to the unique code element in the element palette that is found in the line of XML code. The command is selected from a group of predefined commands. Once produced, the tokens can be compressed. Also while processing the lines of XML code, data is extracted and stored in an uncompressed format. The conversion produces a binary output that contains the element palette, the data, and the tokens (compressed or uncompressed). The binary form of the XML code is saved and can be delivered as a file or served as a data stream.

When the binary form of the XML code is loaded for execution, the tokens are decoded into instructions that operate on the elements referenced in the element palette. In one implementation, the commands in the tokens are translated into calls to a set of interface methods that operate on the unique code elements referenced by the commands. Loading the binary form of the XML code is fast and efficient, taking less time than parsing the original text-based XML code. In the video game context, this allows video games developed with XML to be loaded and run with less delay.

BRIEF DESCRIPTION OF THE DRAWINGS

FIG. 2 diagrammatically illustrates how the various components convert the XML code into a binary format.

FIG. 4 also diagrammatically illustrates how the components load and execute the binary form of the XML code.

The same numbers are used throughout the disclosure and figures to reference like components and features.

DETAILED DESCRIPTION

The following disclosure describes a system and method for converting XML code to a binary form that can be efficiently loaded and executed during runtime. For discussion purposes, the XML-to-binary conversion is performed within the context of video games, where the XML code for a video game is converted to a binary format that can be quickly and efficiently loaded on a game console during runtime. However, the conversion process may be used in many contexts other than video games. Indeed, the conversion process may be employed in essentially any context where a binary version of XML code may be desired or used.

Exemplary System

Figure 1:
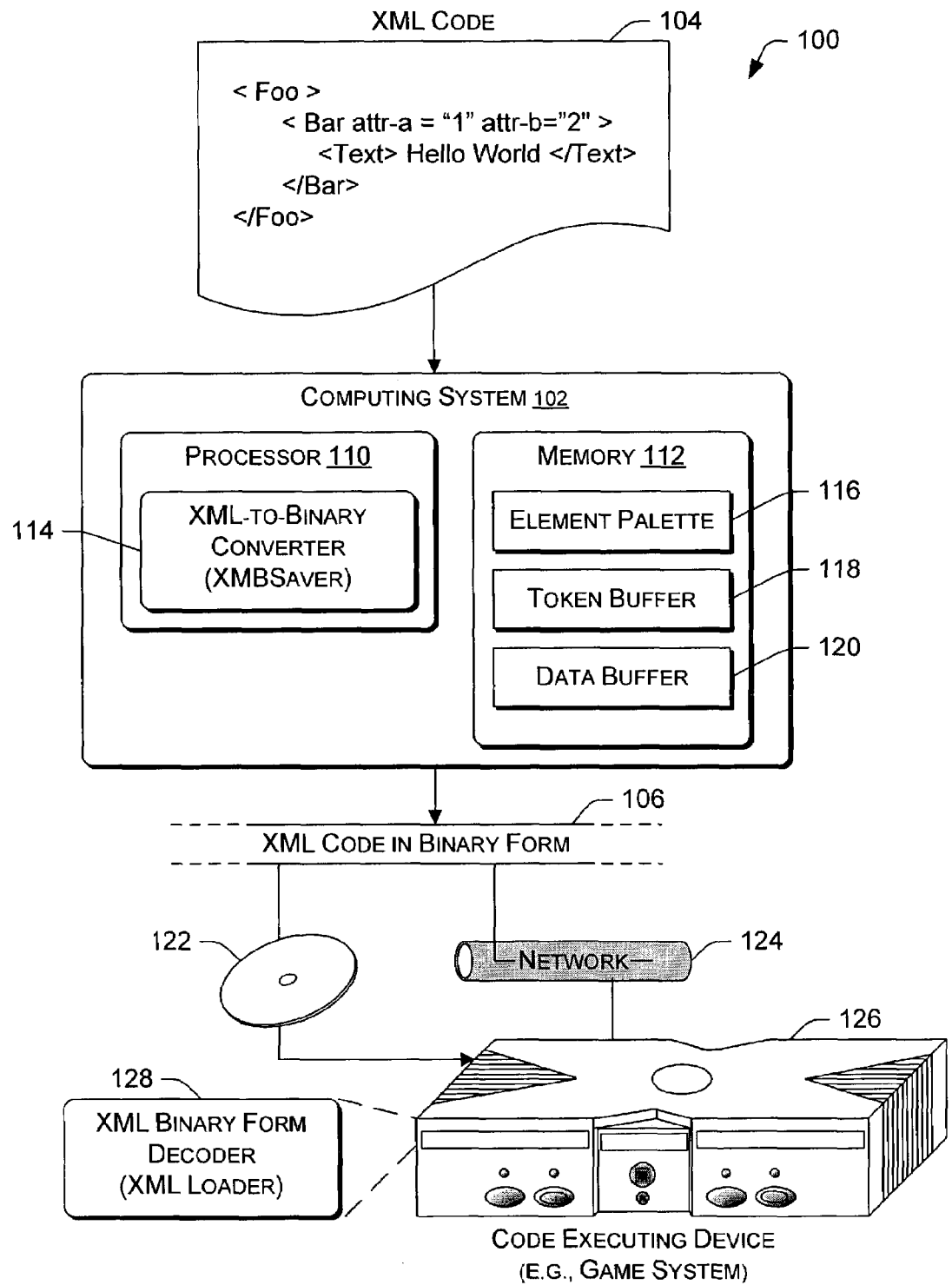
FIG. 1 illustrates an exemplary system environment in which XML code is converted into a binary format for subsequent loading and execution.

FIG. 1 shows an exemplary system environment 100 in which XML code is converted into a binary format for subsequent loading and execution. In environment 100, a computing system 102 receives XML code 104 and converts it to binary form output 106. The computing system 102 has a processor 110 and memory 112. The memory includes both volatile and non-volatile memory.

The computing system 102 implements an XML-to-binary converter 114, which may be implemented in software and executed by processor 110. During conversion, the converter 114 generates an element palette 116 that lists the unique elements in the XML code. A single entry is made for each unique code element found in the XML code. Code elements that appear multiple times are listed once in the element palette 116. The element palette 116 is stored in memory 112 and forms part of the binary output 106.

The XML-to-binary converter 114 also creates individual tokens that represent individual lines (or other logical portions) of the XML code 104. Each token contains a predefined command, selected from a set of predefined commands, which effectively performs the operation of the corresponding line of XML code. Each token also contains a reference to a code element in the element palette 116 that is contained in the corresponding line of XML code.

The tokens are optionally compressed (e.g., LZSS compression) and stored in a token buffer 118. Data is extracted from the XML code during conversion and stored in a data buffer 120. When the token buffer 118 gets full, it is flushed to form part of the binary output 106. In response to flushing the token buffer, the data buffer 120 is automatically flushed to add the data to the binary output 106. In this manner, the binary output 106 contains the element palette 116, followed by interleaved blocks of compressed tokens and uncompressed data.

Once in binary form, the binary XML code 106 can be used in any number of ways. In this example, the binary XML code 106 can be stored as a binary file on a storage medium, such as portable optical disk 122, or served as a data stream over a network 124.

A code executing device 126 executes the binary form of the XML code. The code executing device 126 implements an XML binary form decoder 128 that receives and decodes the binary XML code 106 for loading and execution. The code executing device can be implemented as essentially any type of computing device that is equipped with processing and memory capabilities. In the illustrated implementation, the code executing device 126 is embodied as a console-based gaming system which loads and executes video games that are converted into the binary format. One exemplary console-based gaming system that can execute games utilizing the XML binary form decoder 128 is the Xbox™ gaming system from Microsoft Corporation.

Accordingly, two phases are illustrated in this exemplary environment 100: (1) a conversion phase in which the XML code is converted to a binary format and (2) an execution phase in which the binary format is executed. Although shown and described as being performed at separate computing devices, the conversion and execution phases may performed by the same computing device. These phases are discussed separately in the following sections.

Converting XML Code to Binary Format

Figure 2:
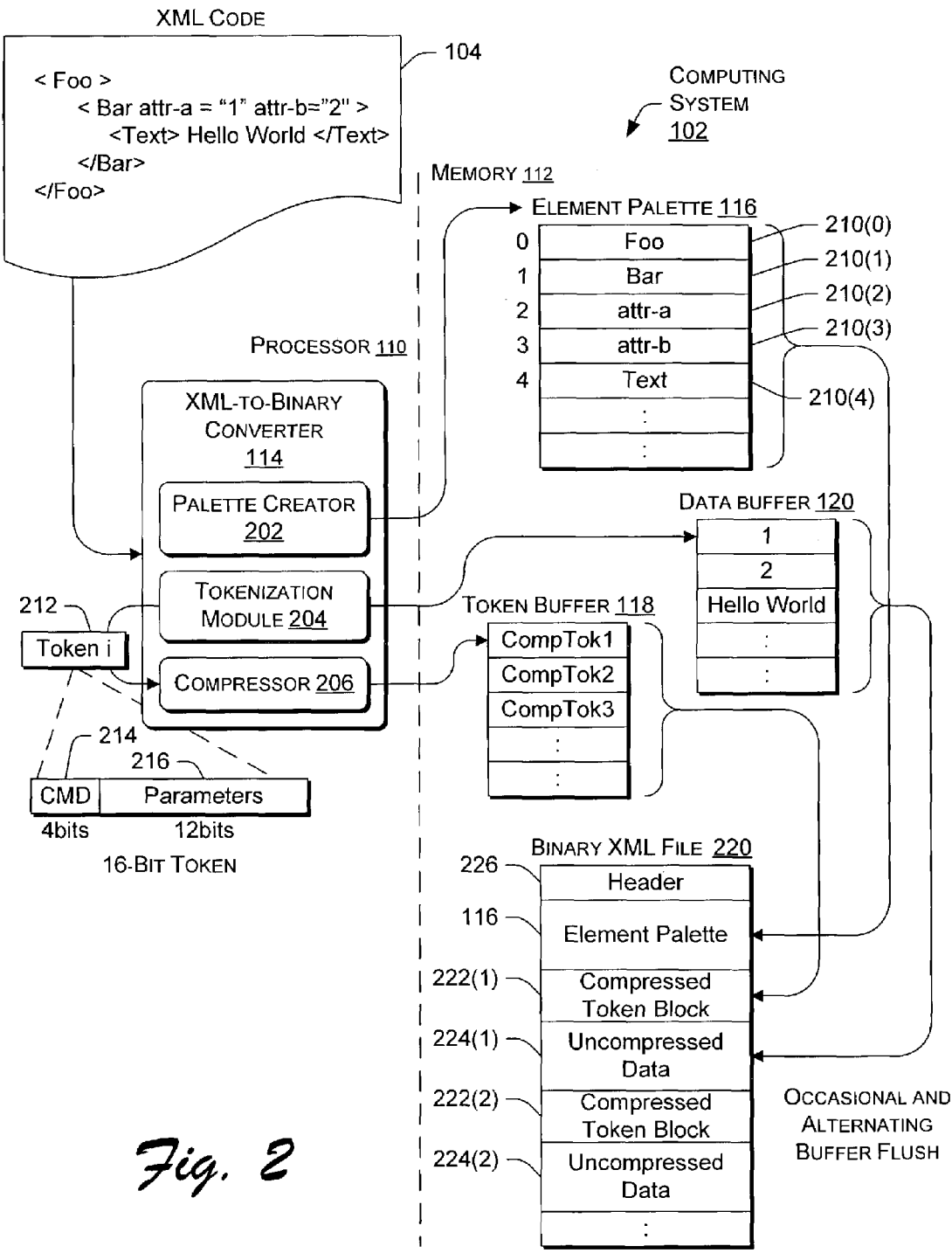
FIG. 2 is a block diagram showing selected components of a computer system that performs conversion.
Figure 3:
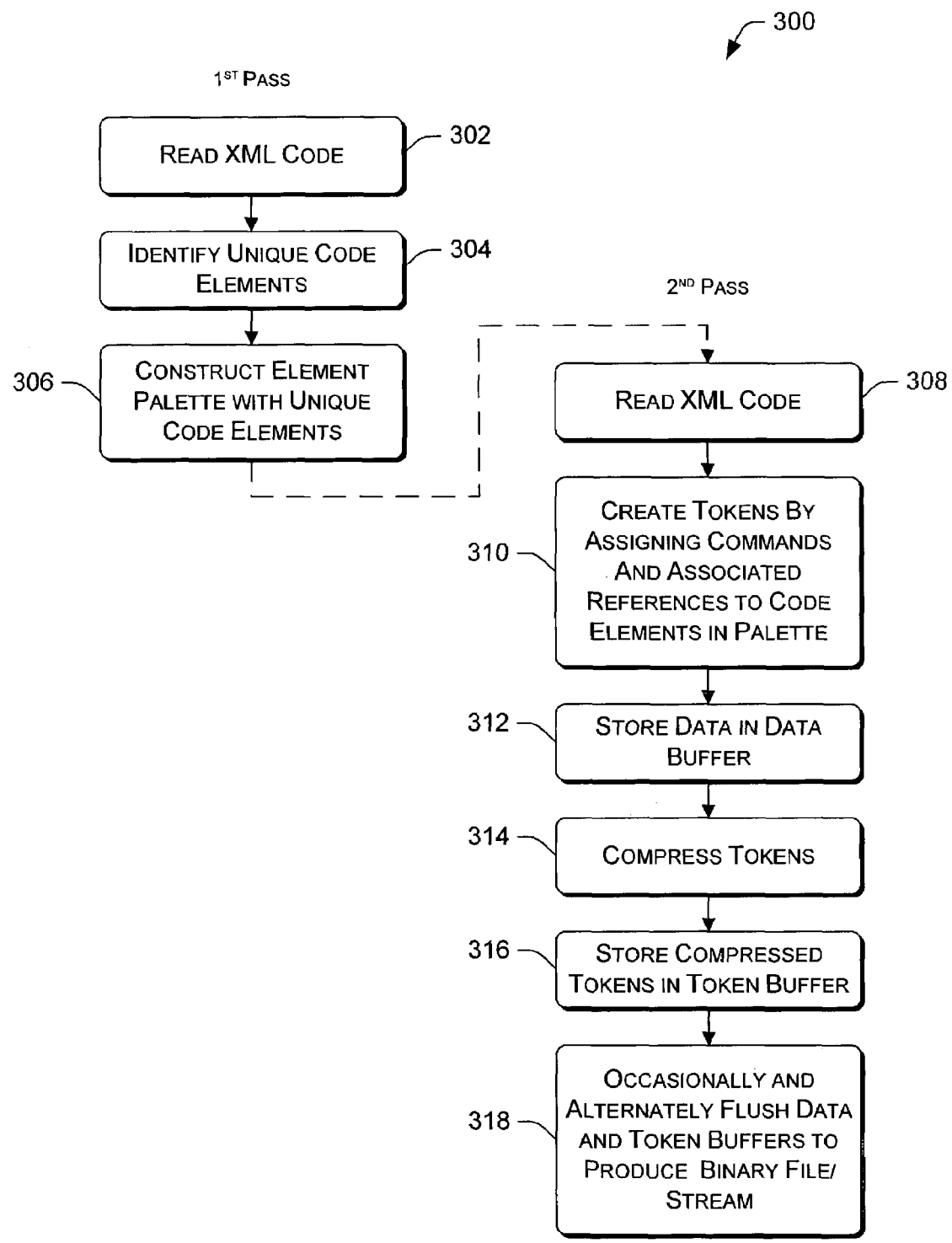
FIG. 3 is a flow diagram of the conversion process for converting XML to the binary format.

FIGS. 2 and 3 illustrate a system and process for converting XML code to a binary format. FIG. 2 shows selected components of the computer system 102 that performs the conversion process. The XML code 104 is passed to the XML-to-binary converter 114 for conversion. The converter 114 is shown executing at the processor 110. The XML-to-binary converter 114 includes a palette creator 202 to form the element palette 116, a tokenization module 204 to generate the tokens, and a compressor 206 to compress the tokens.

FIG. 3 shows a process 300 for converting the XML code to binary format. The process generally involves two passes through the XML code 104. During a first pass, the XML-to-binary converter 114 creates the elements palette 116 that is stored in memory 112. Subsequently, during a second pass, the converter 114 uses the palette 116 to encode the XML code into tokens and data. The process 300 is illustrated as a series of blocks representing individual operations or acts performed by the computing system 102 during the two passes. The process 300 may be implemented in any suitable hardware, software, firmware, or combination thereof. In the case of software and firmware, process 300 represents a set of operations implemented as computer-executable instructions stored in memory and executable by one or more processors. The process 300 will be described with reference to the system in FIGS. 1 and 2.

First Pass: Palette Creation

The computing system 102 generates the element palette 116 during a first pass through the XML code. At block 300 of FIG. 3, the XML-to-binary converter 114 reads through the XML code 104. During this first pass through the code, the palette creator 202 of converter 114 identifies unique code elements in the XML code 104 (block 304 of FIG. 3). As an example of this palette creation process, consider the following XML code 104:

```
< Foo >
    < Bar attr-a = "1" attr-b = "2" >
        < Text > Hello World </Text>
    < /Bar >
< /Foo >
```

This short piece of XML code has five unique elements: "Foo", "Bar", "attr-a", "attr-b", and "Text". The palette creator 202 identifies the unique code elements as the converter reads through the XML code.

At block 306, the palette creator constructs the element palette 116 by adding each unique code element as an entry in the palette. In FIG. 2, the five unique code elements in XML code 104 are listed as the first five entries 210(0)-201(4) in palette 116. There is a single entry for each unique code element, even though some code elements might appear more than once in the code. For instance, in the XML code 104, the element "Foo" appears twice, but is listed once in the element palette 116.

In one implementation, each palette entry is 32 bits. The code elements are processed using a hashing algorithm to produce the 32-bit entries. In the event a collision occurs (i.e., two elements hashing to the same value), the code developer is informed of the collision and instructed to rename the element to remove the collision.

Second Pass: Encoding

During a second pass, the computing system 102 encodes the XML code using the element palette 116. At block 308 of FIG. 3, the XML-to-binary converter 114 begins reading through the XML code 104 a second time. As each portion of code is read, the tokenization module 204 creates a token 212 that represents the code portion. In one implementation, the tokenization module 204 tokenizes each portion of XML code by assigning predefined commands that reference associated elements in the element palette 116 that are contained in that portion of XML code. Each command in the token 212 operates on the referenced element in the same manner that the corresponding text-based instruction in the original XML code would operate on the element. Example commands are shown in Table 1.

TABLE 1

| Example Commands | Operation |
| --- | --- |
| OPEN | Open an element |
| CLOS | Close an element |
| ATTR | Identifies an attribute |
| DATA | Identifies data content |
| SIMPLE DATA | Macro command that is equivalent to OPEN, DATA(1), CLOSE commands |
| EMPTY ELEMENT | Macro command that is equivalent to OPEN, CLOSE commands |
| NUMBER OF ELEMENTS | Identifies the number of elements |

To illustrate the tokenization process, consider the first line in XML code 104, which is "<Foo>". During tokenization, the module 204 first identifies a unique code element in this line of code; in this case, the unique code element is "Foo". Next, the tokenization module 204 discerns that this line of code, as tagged with symbols "<" and ">", is a beginning operation for the element "Foo". The module 204 selects a command from the set of predefined commands in Table 1 that effectively performs the beginning operation. In this example, the predefined OPEN command performs essentially the same operation represented by the XML code "<Foo>". The tokenization module 204 then associates the command with a reference to an entry in the element palette 116 that contains the unique code element "Foo", which is entry 0. Thus, the module 204 encodes the first line of XML code 104 with the OPEN command and a reference to entry 0 in the element palette 116, as follows:

Encoded Token for "<Foo>"→OPEN, 0

This token, when executed, instructs the processor to open the element in entry 0 in the element palette 116, which is element "Foo". Table 2 lists a set of tokens produced by tokenizing other portions of XML code 104.

TABLE 2

| Token | What it does ... |
| --- | --- |
| OPEN, 0 | Opens Foo element |
| OPEN, 1 | Opens Bar element |
| ATTR, 2 | Identifies attribute "attr-a" |
| DATA, length "1" | Identifies data content in the attr-a element as being a certain length |
| ATTR, 3 | Identifies attribute "attr-b" |
| DATA, length "2" | Identifies data content in the attr-b element as being a certain length |
| OPEN, 4 | Opens Text element |
| DATA, length "Hello World" | Identifies the data content in the Text element has being a certain length. |
| CLOS, 4 | Closes Text element |
| CLOS, 1 | Closes Bar element |
| CLOS, 0 | Closes Foo element |

In one implementation, the tokens are equal in size. In the example shown in FIG. 2, each fixed-length token 212 has 16 bits, including a 4-bit command field 214 to hold a command and a 12-bit parameter field 216 to hold a palette reference or a data length parameter. In this manner, portions of XML code that vary in length are all encoded as fixed-length tokens of equal size that conform to a customary 16-bit binary form.

At block 312 of FIG. 3, data extracted during the tokenization process is placed in data buffer 120. This is illustrated graphically in FIG. 2 by extraction of data items "1", "2", and "Hello World" from XML code 104 and storage of these data items in data buffer 120. At block 314, the tokens 212 are optionally compressed by compressor 206. As one example, the compressor implements an LZ compression algorithm, such as the LZSS algorithm. Compressed tokens are stored in the token buffer 118 (block 316).

At block 318, the token buffer 118 and data buffer 120 are occasionally flushed to a binary file 220. In one implementation, the token buffer 118 is flushed when it gets full. After the token buffer contents are stored in binary file 220, the data buffer 120 is then automatically flushed. Due to this alternate flushing, the resulting file 220 interleaves compressed tokens 222(1), 222(2), . . . , 222(J) and uncompressed data 224(1), 224(2), . . . , 224(K). In this manner, the data in the data blocks correspond to the tokens in a neighboring and typically preceding token block. For instance, uncompressed data in block 224(1) may be associated with tokens in compressed token block 222(1), and uncompressed data in block 224(2) may be associated with tokens in compressed token block 222(2), and so on.

The element palette 116 and a header 226 are further included in the binary file. The binary file 220 contains a header 226, an element palette 116 with multiple 32-bit entries, blocks 222 of compressed 16-bit tokens, and blocks 224 of uncompressed data. Once formed, the binary file 220 can be transferred as a file or transmitted as a data stream.

Executing Binary XML Code

Figure 4:
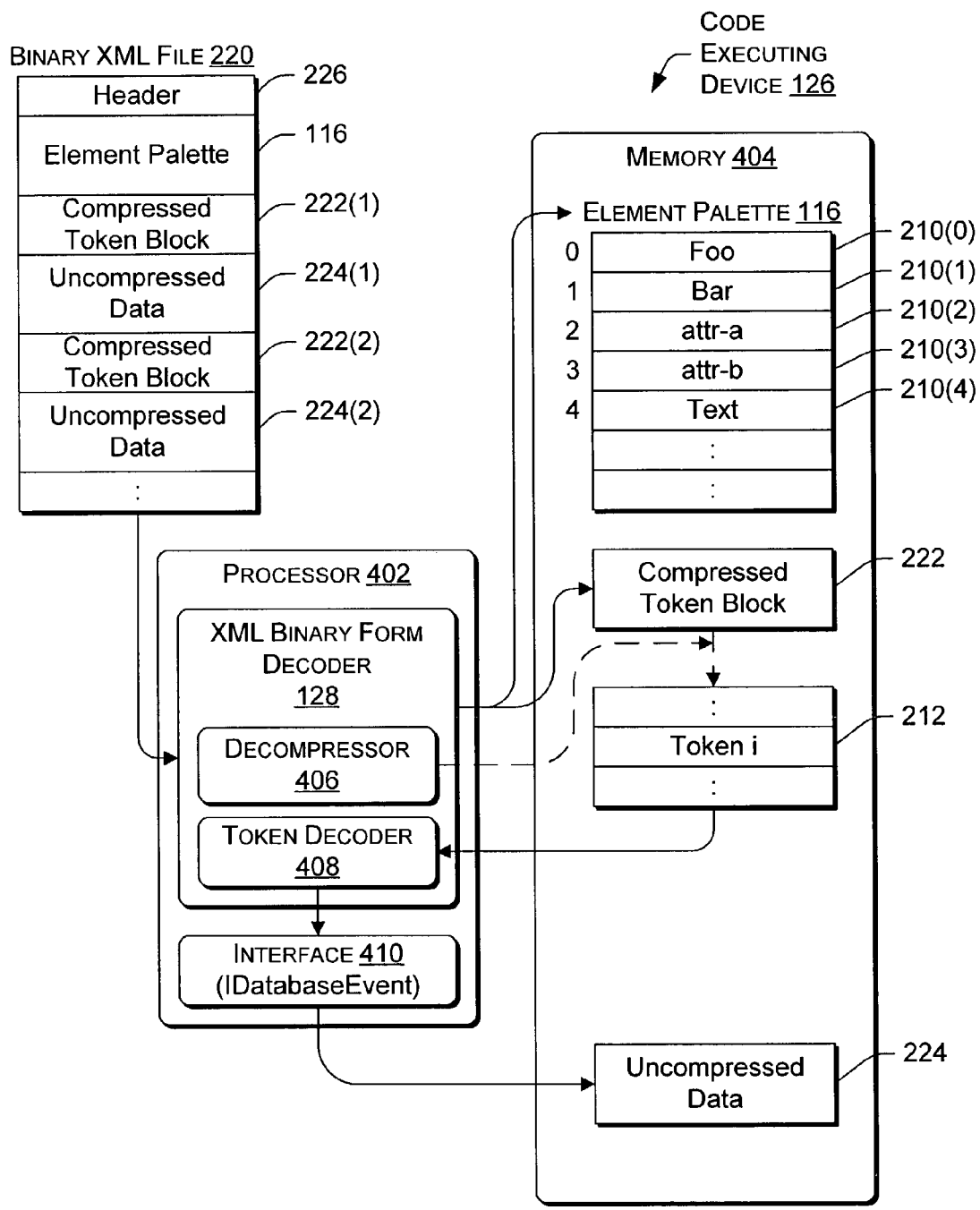
FIG. 4 is a block diagram showing selected components of code executing device that loads and executes the binary form of the XML code.
Figure 5:
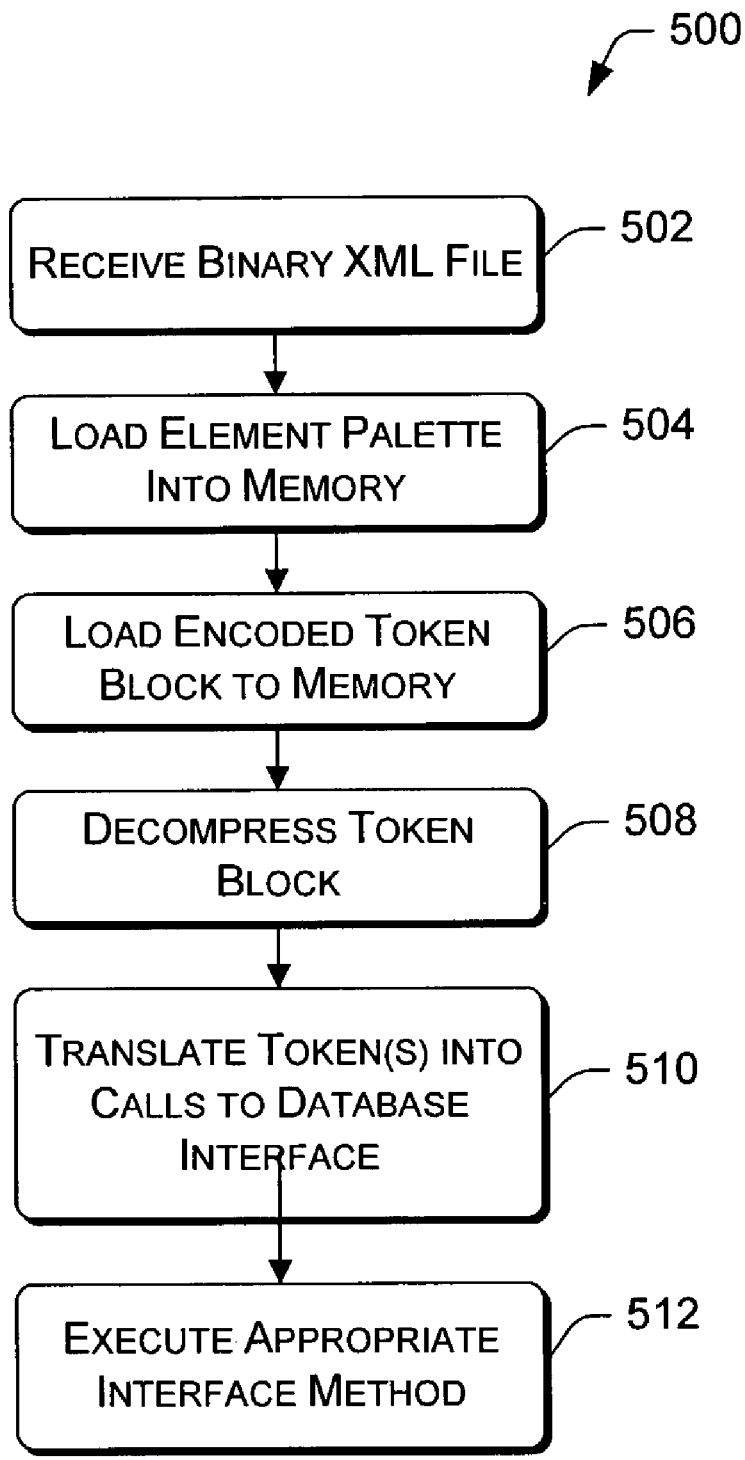
FIG. 5 is a flow diagram of the execution process for loading and executing the binary form of the XML.

FIGS. 4 and 5 illustrate a system and process for executing the binary XML code. FIG. 4 shows selected components of the code executing device 126 that executes the binary XML file 220 during runtime. The code executing device 126 may be implemented as many different types of computing devices, including as the gaming system illustrated in FIG. 1. The code executing device 126 has a processor 402 and memory 404. The XML binary form decoder 128 is shown executing at the processor 402. The decoder 128 includes a decompressor 406 to decompress the compressed token blocks 222 and a token decoder 408 to decode individual tokens contained in the blocks. The code executing device 126 further implements a set of interfaces 410, including a database interface called IDatabaseEvent, which is called to execute individual tokens that have been decoded by the decoder 128.

FIG. 5 shows a process 500 for executing the binary XML code. The process 500 may be implemented in any suitable hardware, software, firmware, or combination thereof. In the case of software and firmware, process 500 represents a set of operations implemented as computer-executable instructions stored in memory and executable by one or more processors. The process 500 will be described with reference to the system in FIGS. 1 and 4.

At block 502, the code executing device 126 receives the binary XML file 220, where it is passed to the XML binary form decoder 128 for decoding. The decoder 128 processes the file header 226 and then loads the element palette 116 into memory 404 (block 504). At block 506, the decoder 128 loads the first compressed token block 222(1) into memory 404. At block 508, the decompressor 406 decompresses the compressed token block 222(1) to recover individual tokens 212. The decompressed tokens are passed to the token decoder 408, where the commands and references are translated into calls to the interface 410 (block 510).

In one implementation, individual tokens are translated into calls to a database interface named IDatabaseEvent, which accesses the elements in element palette 116 and uncompressed data blocks 224 in binary file 220. The database interface provides a set of methods that facilitate execution of the commands. Table 3 lists an exemplary set of five interface methods.

TABLE 3

| Interface Method | What it does ... |
| --- | --- |
| OnBeginDocument | Opens binary XML document. |
| OnEndDocument | Closes binary XML document. |
| OnBeginElement | Opens elements and attributes, such as XML schema defined elements that contains detailed information. This method is called with the XML schema definition. |
| OnEndElement | Closes elements and attributes. This method is called with the XML schema definition. |
| OnData | Gets data from opened elements in binary XML file. This method is called with the XML schema definition and size of data. |

As the tokens are translated, the appropriate interface method is executed. For instance, the token "OPEN, 0" is translated to an interface call for the method OnBeginElement and the element "Foo" is accessed from entry 0 in palette 116 and passed into the method. Table 4 shows the translation of the example set of tokens produced from XML code 104.

TABLE 4

| Token | Translated into . . . |
|---|---|
| OPEN, 0 | OnBeginElement(Foo) |
| OPEN, 1 | OnBeginElement(Bar) |
| ATTR, 2 | OnBeginElement(attr-a) |
| DATA, length "1" | OnData(index and length of data for attr-a in uncompressed data block) |
| | OnEndElement(attr-a) |
| ATTR, 3 | OnBeginElement(attr-b) |
| DATA, length "2" | OnData(index and length of data for attr-b in uncompressed data block) |
| | OnEndElement(attr-b) |
| OPEN, 4 | OnBeginElement(Text) |
| DATA, length "Hello World" | OnData(index and length of data for attr-b element uncompressed data block) |
| CLOS, 4 | OnEndElement (Text) |
| CLOS, 1 | OnEndElement (Bar) |
| CLOS, 0 | OnEndElement (Foo) |

Once translated, each interface method is executed (block 512). Thus, execution of the binary XML code 220 merely involves decompression of tokens and translation of the token commands to interface calls that execute on the referenced elements in palette 116. The loading and execution are fast, especially in comparison to loading and executing the original XML code in its text-based state. By converting the XML code to a binary format, there is no parsing at the code executing device, which significantly reduces the load and execution time.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
    identifying unique code elements in XML code;
    storing the unique code elements in a data structure;
    encoding portions of the XML code into fixed-length tokens, individual tokens having a predefined command and a reference to one of the unique code elements in the data structure, the encoding comprising, for each portion of the XML code:
        identifying a particular unique code element contained in the portion of the XML code;
        selecting, from a set of predefined commands, a predefined command that performs the portion of the XML code; and
        associating, in the data structure, the predefined command with a reference to the particular unique code element that is operated according to the predefined command;
    extracting data from the XML code; and
    forming an output containing the data structure, the tokens, and the data.

2. A method as recited in claim 1, wherein the data structure comprises a list, with each unique code element having an entry in the list.

3. A method as recited in claim 1, wherein the tokens comprise 16-bit tokens, each 16-bit token having a 4-bit command field to hold the predefined command and a 12-bit parameter field to hold the reference.

4. A method as recited in claim 1, further comprising compressing the tokens.

5. A method as recited in claim 1, further comprising:
    storing the data in a data buffer;
    storing the tokens in a token buffer; and
    alternately flushing the token buffer and the data buffer to interleave the tokens and the data in the output.

6. A method as recited in claim 1, wherein the output comprises a binary file.

7. One or more computer-readable storage media comprising computer-executable instructions that, when executed, perform the method as recited in claim 1.

8. A computer-implemented method comprising:
    during a first pass through XML code, creating a data structure listing unique code elements found in the XML code;
    during a second pass through the XML code, deriving fixed-length tokens representative of the XML code, each token having a predefined command and a reference to one of the unique code elements in the data structure, the deriving comprising, for each portion of the XML code:
        identifying a particular unique code element contained in the portion of the XML code;
        selecting, from a set of predefined commands, a predefined command that performs the portion of the XML code; and
        associating, in the data structure, the predefined command with a reference to the particular unique code element that is operated according to the predefined command.

9. A method as recited in claim 8, further comprising compressing the tokens.

10. A method as recited in claim 8, further comprising constructing a binary file comprising the data structure, the tokens and data contained in the XML code.

11. A method as recited in claim 8, further comprising:
    extracting data from the XML code during the second pass;
    compressing the tokens during the second pass; and
    constructing a binary file comprising the data structure followed by interleaved blocks of compressed tokens and uncompressed data.

12. One or more computer-readable storage media comprising computer-executable instructions that, when executed, perform the method as recited in claim 8.

13. A method comprising:
    converting XML code to a binary output having a list of unique code elements from the XML code, a plurality of fixed-length tokens each having a command selected from a set of commands that represent the XML code and reference associated with one of the unique code elements, and data extracted from the XML code, the converting comprising:
        creating a data structure listing the unique code elements found in the XML code; and
        for each portion of the XML code, identifying a particular unique code element contained in the portion of the XML code, selecting a command from the set of commands that performs the portion of the XML code, and associating the command with a reference to the particular unique code element in the data structure, wherein the particular unique code element is operated according to the command; and executing the binary output.

14. A method as recited in claim 13, wherein the executing comprises:

translating the commands into instructions; and performing the instructions on the unique code elements referenced by the commands.

15. A method as recited in claim 14, wherein one of the instructions pertains to an operation involving the data, and the performing comprises using the data in the binary output during performance of said one instruction.

16. A method as recited in claim 13, wherein the executing comprises:

translating the commands into calls to a database interface; and calling various methods exposed by the database interface to access the unique code elements and the data from the binary output.

17. One or more computer-readable storage media comprising computer-executable instructions that, when executed, perform the method as recited in claim 13.

18. A computer-readable storage medium storing computer-executable instructions that, when executed by a processor, perform acts comprising:

identifying unique code elements in XML code;

encoding portions of the XML code into fixed-length tokens, each token having a command that represents the portion of the XML code and a reference to one of the unique code elements found in the portion of XML code, the encoding comprising:

creating a data structure listing the unique code elements found in the XML code; and for each portion of the XML code, identifying a particular unique code element contained in the portion of the XML code, selecting a command from the set of commands that performs the portion of the XML code, and associating the command with a reference to the particular unique code element in the data structure, wherein the referenced unique code element is operated according to the command; and forming an output containing the unique code elements, the tokens, and data extracted from the XML code.

19. A computer-readable storage medium as recited in claim 18, wherein the tokens comprise 16-bit tokens, each token having a 4-bit command field to hold the predefined command and a 12-bit parameter field to hold the reference.

20. A computer-readable storage medium as recited in claim 18, further comprising computer-executable instructions that, when executed by a processor, perform acts comprising compressing the tokens.

21. A computer-readable storage medium as recited in claim 18, further comprising computer-executable instructions that, when executed by a processor, perform acts comprising:

during the encoding, storing the data in a data buffer and storing the tokens in a token buffer; and alternately flushing the token buffer and the data buffer to interleave the tokens and the data in the output.

22. A computer-readable storage medium as recited in claim 18, wherein the output is a binary file.

23. One or more computer-readable storage media storing computer-executable instructions that, when executed by a processor, perform acts comprising:

converting XML code to a binary output by:

storing unique code elements found in the XML code in a data structure;

encoding portions of the XML code into fixed-length tokens, individual tokens associating a predefined command that represents the portion of the XML code with a reference to the data structure that identifies one of the unique code elements found in the portion of the XML code the encoding comprising identifying a particular unique code element contained in the portion of the XML code, selecting a command from the set of commands that performs the portion of the XML code, and associating the command with a reference to the particular unique code element in the data structure, wherein the referenced unique code element is operated according to the command;

extracting data from the XML code; and forming the binary output as containing the data structure, the tokens, and the data; and executing the binary output by:

translating the commands into instructions; and performing the instructions on the unique code elements in the data structure that are referenced by the commands.

24. A computer-readable storage medium as recited in claim 23, wherein the tokens comprise 16-bit tokens, each token having a 4-bit command field to hold the predefined command and a 12-bit parameter field to hold the reference.

25. A computer-readable storage medium as recited in claim 23, further comprising computer-executable instructions that, when executed by a processor, perform acts comprising compressing the tokens.

26. A data structure stored on a computer-readable storage medium, comprising:

an element palette containing unique code elements identified in a piece of XML code;

at least one token block of fixed-length tokens, each token containing a predefined command associated with a reference to one of the unique code elements in the element palette, wherein the referenced unique code element is operated on the basis of the predefined command;

at least one data block containing data extracted from the piece of XML code;

for each piece of the XML code, identifying a particular unique code element contained in the piece of the XML code, selecting a command from the set of commands that performs the piece of the XML code, and associating the command with a reference to the particular unique code element in the data structure, wherein the particular unique code element is operated according to the command; and executing the binary output.

27. A data structure as recited in claim 26, wherein individual tokens are compressed, and the block of tokens comprises multiple compressed tokens.

28. A data structure as recited in claim 26, further comprising multiple token blocks and multiple data blocks, wherein the token and data blocks are interleaved.

29. A data structure as recited in claim 26, further comprising multiple token blocks and multiple data blocks, wherein the token and data blocks are interleaved such that data in the data blocks correspond to tokens contained in a neighboring token block.

30. A computing system, comprising:

a memory;

a processor coupled to the memory; and an XML-to-binary converter executing on the processor to convert XML code to a binary output, the binary output having a list of unique code elements identified in the XML code, data extracted from the XML code, and fixed-length tokens, where individual tokens associate a command selected from a set of commands with a reference to one of the unique code elements, wherein the referenced unique code element is operated on the basis of the predefined command; the converting comprising:
- creating a data structure listing the unique code elements found in the XML code; and
- for each portion of the XML code, identifying a particular unique code element contained in the portion of the XML code, selecting a command from the set of commands that performs the portion of the XML code, and associating the command with a reference to the particular unique code element in the data structure, wherein the particular unique code element is operated according to the command.

31. A computing system as recited in claim 30, wherein the XML-to-binary converter is configured to derive the tokens by discerning, for a portion of XML code, a command that is operationally representative of the portion of XML code and associating the predefined command with a reference to the unique code element contained in the portion of XML code.

32. A computing system as recited in claim 30, wherein the XML-to-binary converter is further configured to compress the tokens.

33. A computing system as recited in claim 30, wherein the memory comprises a token buffer and a data buffer, and the XML-to-binary converter stores the tokens in the token buffer and the data in the data buffer as the XML code is being converted, the token buffer and data buffer being alternately flushed to interleave the tokens and the data in the binary output.

34. A computing system as recited in claim 30, wherein the token buffer is flushed when full and the data buffer is automatically flushed in response to flushing the token buffer.

35. A computing system for converting XML code to a binary format, comprising:
- a memory;
- a processor coupled to the memory;
- a palette creator to create an element palette that lists unique code elements from the XML code; and
- a tokenization module to produce fixed-length tokens representative of portions of the XML code, the tokenization module being configured to select, for each portion of XML code, a predefined command that represents the portion of XML code and to associate the command with a reference to a unique code element in the element palette upon which the command operates, wherein individual tokens contain the command and the associated reference, and wherein the unique code element with which the reference is associated is operated on the basis of the command the converting comprising:
  - creating a data structure listing the unique code elements found in the XML code; and
  - for each portion of the XML code, identifying a particular unique code element contained in the portion of the XML code, selecting a command from the set of commands that performs the portion of the XML code, and associating the command with a reference to the particular unique code element in the data structure, wherein the particular unique code element is operated according to the command.

36. A computing system as recited in claim 35, wherein the tokens comprise 16-bit tokens, each token having a 4-bit command field to hold the predefined command and a 12-bit parameter field to hold the reference.

37. A computing system as recited in claim 35, further comprising a compressor to compress the tokens.

38. A computing system as recited in claim 35, further comprising:
- a data buffer to hold data extracted from the XML code during tokenization;
- a token buffer to hold the tokens; and
- wherein the first and second buffers are alternately flushed to form a binary output that interleaves the tokens and the data.

39. A computing system for executing XML code that has been converted to a binary form, the binary form containing a list of unique code elements from the XML code, data extracted from the XML code, and a plurality of tokens each having a command selected from a set of predefined commands representative of portions of the XML code and reference to one of the unique code elements, the computing system comprising:
- a memory;
- a processor coupled to the memory; and
- an XML binary form decoder to decode the binary form of the XML code by storing the list and the data in the memory, translating, from each of the plurality of fixed-length tokens, the command and reference to the unique code element into a plurality of calls to different ones of the interface methods instructions that operate on the unique code element according to the command associated with the unique code element.

40. A computing system as recited in claim 39, wherein one of the instructions pertains to an operation involving the data, and the XML binary form decoder uses the data stored in the memory during performance of said one instruction.

41. A computing system as recited in claim 39, wherein the XML binary decoder translates each of the commands into a call to a database interface that accesses the unique code elements in the list and the data stored in the memory.

42. A computing system as recited in claim 39, embodied as a gaming system.

43. A computing system for executing XML code that has been converted to a binary form, the binary form containing a list of unique code elements from the XML code, data extracted from the XML code, and a plurality of fixed-length tokens each having a command selected from a set of predefined commands representative of portions of the XML code and reference to one of the unique code elements, wherein the commands reference entries in the list that contain the unique code elements found in the portions of XML code represented by the commands, the computing system comprising:
- a memory;
- a processor coupled to the memory;
- an interface that exposes a set of interface methods; and
- a decoder to decode from the plurality of fixed-length tokens, the commands into a plurality of calls to different ones of the interface methods that operate on each of the unique code elements according to the one of the commands that associates with the unique code element.

44. A computing system as recited in claim 43, embodied as a gaming system.

* * * * *

UNITED STATES PATENT AND TRADEMARK OFFICE
CERTIFICATE OF CORRECTION

| | | |
|---|---|---|
| PATENT NO. | : 7,350,199 B2 | Page 1 of 1 |
| APPLICATION NO. | : 10/346533 | |
| DATED | : March 25, 2008 | |
| INVENTOR(S) | : Yuichi Ito et al. | |

It is certified that error appears in the above-identified patent and that said Letters Patent is hereby corrected as shown below:

In column 12, line 57, in Claim 43, after "decode" insert -- , --.

Signed and Sealed this

Twenty-second Day of February, 2011

David J. Kappos
*Director of the United States Patent and Trademark Office*